(12) United States Patent
Yamaguchi

(10) Patent No.: US 8,487,916 B2
(45) Date of Patent: Jul. 16, 2013

(54) INPUTTING APPARATUS, INPUTTING METHOD AND FABRICATION METHOD FOR INPUTTING APPARATUS

(75) Inventor: Kazunori Yamaguchi, Kanagawa (JP)

(73) Assignee: Japan Display West, Inc., Aichi-Ken (JP)

( * ) Notice: Subject to any disclaimer, the term of this patent is extended or adjusted under 35 U.S.C. 154(b) by 1429 days.

(21) Appl. No.: 11/562,278

(22) Filed: Nov. 21, 2006

(65) Prior Publication Data

US 2007/0120836 A1  May 31, 2007

(30) Foreign Application Priority Data

Nov. 22, 2005 (JP) ................................. 2005-337456
Oct. 3, 2006 (JP) ................................. 2006-271732

(51) Int. Cl.
*G09G 5/00* (2006.01)

(52) U.S. Cl.
USPC ...................................... 345/179; 235/472.01

(58) Field of Classification Search
USPC .................. 345/179, 175, 173; 235/462.49, 235/472.01; 359/459; 250/559.29; 348/373
See application file for complete search history.

(56) References Cited

U.S. PATENT DOCUMENTS

| 5,162,640 | A | * | 11/1992 | Ishikawa | ................... | 235/462.49 |
| 5,745,177 | A | * | 4/1998 | Lamoure | ........................ | 348/373 |
| 6,100,538 | A | | 8/2000 | Ogawa | | |
| 7,342,575 | B1 | * | 3/2008 | Hartwell et al. | .............. | 345/179 |
| 2004/0041798 | A1 | * | 3/2004 | Kim | ................................ | 345/179 |
| 2005/0052435 | A1 | | 3/2005 | Cho et al. | | |
| 2005/0264227 | A1 | | 12/2005 | Tateuchi | | |
| 2006/0017717 | A1 | | 1/2006 | Tateuchi | | |
| 2006/0114560 | A1 | * | 6/2006 | Shimoda | ........................ | 359/459 |

FOREIGN PATENT DOCUMENTS

| JP | 02-211421 | | 8/1990 |
| JP | 11-119898 | | 4/1999 |
| JP | 2000-132327 | | 5/2000 |
| JP | 2002-049466 | | 2/2002 |
| JP | 2002-287900 | | 10/2002 |
| JP | 2004139191 | | 5/2004 |
| JP | 2005004682 | | 1/2005 |
| JP | 2005-38309 | * | 2/2005 |
| JP | 2005-038309 | | 2/2005 |
| JP | 2005043992 | | 2/2005 |
| JP | 2005-085265 | | 3/2005 |
| JP | 2005085265 | | 3/2005 |

(Continued)

OTHER PUBLICATIONS

European Patent Office, Partial European Search Report issued in connection with European Patent Application No. 06124594.0, dated Jul. 9, 2012. (5 pages).

(Continued)

*Primary Examiner* — Quan-Zhen Wang
*Assistant Examiner* — Yuk Chow
(74) *Attorney, Agent, or Firm* — K&L Gates LLP

(57) ABSTRACT

An inputting apparatus, inputting method and fabrication method for inputting apparatus are provided. The inputting apparatus for inputting information making use of light, including, a body member having an end portion, a substantially spherical lens member retained at the end portion of the body member, and a reflecting member disposed between the end portion of the body member and the lens member and configured to reflect at least part of light incoming from the outside of the inputting apparatus.

17 Claims, 10 Drawing Sheets

FOREIGN PATENT DOCUMENTS

| | | |
|---|---|---|
| JP | 2005293374 | 10/2005 |
| JP | 2005301373 | 10/2005 |
| JP | 2005309482 | 11/2005 |
| JP | 2005338428 | 12/2005 |
| JP | 2006030855 | 2/2006 |

OTHER PUBLICATIONS

European Patent Office, Extended European Search Report issued in connection with European Patent Application No. 06124594.0, dated Nov. 2, 2012. (13 pages).

\* cited by examiner

RECEPTION LIGHT AMOUNT

DETECTION REGION (y) OF RECEPTION LIGHT AMOUNT

DETECTION REGION (x) OF RECEPTION LIGHT AMOUNT

RECEPTION LIGHT AMOUNT WITH BALL LENS OF φ5

RECEPTION LIGHT AMOUNT WITH BALL LENS OF φ3

RECEPTION LIGHT AMOUNT WITH BALL LENS OF φ2

INPUTTING APPARATUS, INPUTTING METHOD AND FABRICATION METHOD FOR INPUTTING APPARATUS

CROSS REFERENCES TO RELATED APPLICATIONS

The present application to Japanese Patent Application JP 2005-337456 filed in the Japanese Patent Office on Nov. 22, 2005 and Japanese Patent Application JP 2006-271732 filed in the Japanese Patent office on Oct. 3, 2006, the entire contents of which being incorporated herein by reference.

BACKGROUND

This invention relates to an inputting apparatus suitable for use to input a locus, for example, on a display unit which is capable of emitting and receiving a light flux and display a locus of the light flux on the display unit so that the locus can be recognized, a fabrication method for the inputting apparatus and an inputting method using the inputting apparatus.

In related art, where a touch panel is formed on a display screen of an image display apparatus in such a manner that an operator is capable of operating the touch panel by touching with the screen, the touch panel is formed separately from the display apparatus and is placed on the display screen.

On the other hand, a display apparatus has been proposed which has a light emitting function and a light receiving function and includes a screen which functions as it is as a touch panel without provision of a separate touch panel. A display apparatus of the type described is disclosed, for example, in Japanese Patent Laid-Open No. 2005-301373 (hereinafter referred to as Patent Document 1), 2005-293374 (hereinafter referred to as Patent Document 2), 2005-338428 (hereinafter referred to as Patent Document 3) or 2006-30855 (hereinafter referred to as Patent Document 4).

Further, as an apparatus for irradiating a flux of light from the outside on the surface of a display apparatus to indicate a position without using reflected light, an instrument for irradiating light from a remote position such as a pointer or a light emitting pen having a light source in the inside thereof has been proposed. Such a light emitting pen as just described is disclosed, for example, in Japanese Patent Laid-Open No. 2005-43992 (hereinafter referred to as Patent Document 5) or 2005-4682 (hereinafter referred to as Patent Document 6). However, even if a laser pointer is used, before a laser beam is emitted, it cannot be known which place on a display panel the laser beam points to. Further, since the laser pointer is operated at a remote place, a character or the like cannot be drawn well, and therefore, enhancement of the operability is demanded. Further, even if a light emitting pen which includes a light source provided in the inside thereof and emits light from the tip thereof is used, a power supply for driving the light source to emit light is required. Where a cell or the like is built in and used together with the light emitting pen, replacement of the built-in cell is required when the voltage drops. Further, where a rechargeable cell is used, it is necessary to provide a charger and a space for the charger, and this requires complicated handling. Further, use of a cell generally increases the size and the cost.

Meanwhile, as a display panel which allows inputting thereto by means of a pen, a resistance film type touch panel or an electrostatic capacitance type touch panel is available. The resistance film type touch panel is disclosed, for example, in Japanese Patent Laid-Open No. 2005-309482 (hereinafter referred to as Patent Document 7) or 2004-139191 (hereinafter referred to as Patent Document 8). However, such display panels is capable of merely detecting a coordinate position but cannot perform detection of multiple points or detection of an area, different from touch panels of the optical inputting type.

Also a display apparatus has been proposed which has such a light emitting function and a light receiving function and allows inputting of information using an input pen. A display apparatus of the type described is disclosed, for example, in Japanese Patent Laid-Open No. 2005-85265 (hereinafter referred to as Patent Document 9).

Incidentally, where such a material body as a pen which is not likely to closely contact with the surface of a display panel is used for inputting, since light from the surface of the display panel diffuses, the amount of reflected light decreases. Thus, even if the surface of the display panel is formed so as to have a white color or is formed as a mirror surface in order to prevent such reduction of the reflect light amount, the light is diffused again by the surface. Consequently, the amount of light which reaches optical sensors on the surface of the display panel is reduced to such a low level that the reflected light cannot be detected by the display panel side.

Meanwhile, Patent Document 9 discloses, particularly in FIG. 2, an input pen wherein a recessed portion is provided at a light conversion portion (portion for reflecting display light) at the tip of the input pen so that display light may be irradiated in a concentrated manner upon a smaller area. However, even where an input pen is configured in such a manner as just described, it still fails to sufficiently increase the amount of reflected light.

SUMMARY

Therefore, it is desirable to provide an inputting apparatus and an inputting method wherein the amount of reflected light originating from external light can be increased to facilitate an inputting operation.

Also it is desirable to provide a fabrication method for an inputting apparatus by which an inputting apparatus which is capable of increasing the amount of reflected light originating from external light can be fabricated simply and easily.

According to an embodiment, there is provided an inputting apparatus for inputting information making use of light, including a body member having an end portion, a substantially spherical lens member retained at the end portion of the body member, and a reflecting member disposed between the end portion of the body member and the lens member and configured to reflect at least part of light incoming from the outside of the inputting apparatus.

According to another embodiment, there is provided an information inputting method for inputting information to a display apparatus which has a light receiving function and a light emitting function by using an inputting apparatus, including the steps of inputting display light emitted from the display apparatus making use of the light emitting function of the display apparatus to the inputting apparatus through a substantially spherical lens member which is retained at an end portion of the inputting apparatus and is capable of transmitting the display light therethrough, reflecting at least part of the display light incoming to the inputting apparatus in the inside of the inputting apparatus so as to conduct to the display apparatus side, and receiving the reflected display light making use of the light receiving function of the display apparatus.

In the inputting apparatus and the inputting method, incoming light from the outside or display light passes through the substantially spherical lens member retained at the end portion of the inputting apparatus, and at least part of the light is reflected and goes out from the lens member.

According to a further embodiment, there is provided a fabrication method for an inputting apparatus which inputs information making use of light, including the steps of forming a body member for the inputting apparatus, retaining a substantially spherical lens member at an end portion of the body member, and disposing a reflecting member capable of reflecting at least part of incoming light from the outside of the inputting apparatus between the end portion of the body member and the lens member.

With the inputting apparatus and the inputting method, since incoming light from the outside or display light passes through the substantially spherical lens member and at least part of the light is reflected and goes out from the lens member, the reflection efficiency can be raised thereby to increase the reflected light amount. Consequently, an inputting object apparatus is capable of recognizing the reflected light readily and an inputting operation can be performed readily.

With the fabrication method for an inputting apparatus, since the substantially spherical lens member is retained at the end portion of the body member and the reflecting member is disposed between the end portion of the body member and the reflecting member, the inputting apparatus can be fabricated readily in a high fabrication efficiency. Further, the reflection efficiency can be raised by the lens member and the reflecting member to increase the reflected light amount. Consequently, an inputting apparatus which is capable of increasing the amount of reflected light originating from light from the outside can be obtained simply and readily.

Additional features and advantages are described herein, and will be apparent from, the following Detailed Description and the figures.

DETAILED DESCRIPTION

A first embodiment is described with reference to FIGS. 1 to 6C.

This relates to be used to perform an inputting operation to a display apparatus which has a display face for emitting display light and is capable of detecting light incoming to the display face. The display apparatus used in the present embodiment is of the type wherein a light emitting element is disposed at each of pixels which form an organic EL (Electro Luminescence) display unit such that emission of light (display) and reception of light (reading) can be performed alternately. Where the display apparatus wherein the light receiving elements are displayed together with the pixels on a plane is used, the position of a neighboring material body such as, for example, an input pen or a fingertip can be detected. Consequently, it is possible to detect the position of the material body such as the input pen or a fingertip before the material body is brought into contact with the display face and to perform screen display conforming to the detected position.

Figure 1:
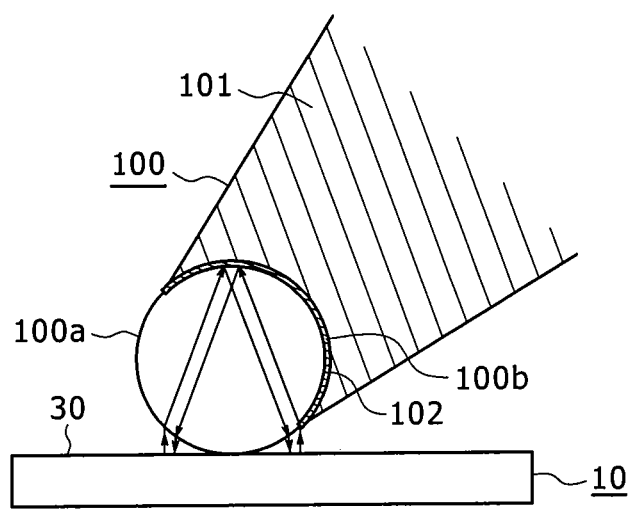
FIG. 1 is a sectional view showing an example of an input pen according to an embodiment.
Figure 2:
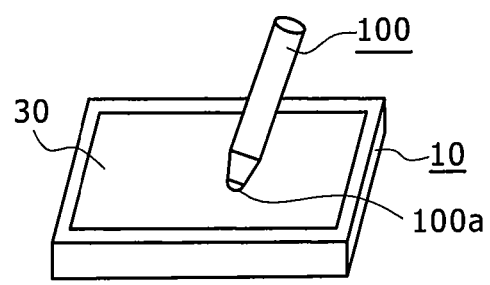
FIG. 2 is a perspective view showing an example of a display apparatus according to an embodiment which cooperates with the input pen shown in FIG. 1.

First, an example of a configuration of the input pen and the display apparatus is described with reference to FIG. 1. FIG. 1 shows a portion of the input pen in the proximity of the tip, and FIG. 2 shows the entire input pen. Referring to FIGS. 1 and 2, the input pen 100 which is capable of inputting a locus by moving the same in the proximity of the screen and the display apparatus 10 for repeating reception and emission of light at predetermined timings detect a locus of the input pen 100 and displaying the detected locus of the input pen 100 cooperate with other to perform inputting and displaying. An example of an internal configuration of the display apparatus 10 is hereinafter described. Referring particularly to FIG. 2, the input pen 100 includes a bar-like pen body 101 and a spherical ball lens 100a attached at a semispherical portion thereof in an projecting state to an end portion of the pen body 101. Referring now to FIG. 1, a retaining portion 102 for the ball lens 100a is formed at an end portion of the bar-like pen body 101 of the input pen 100, and the spherical ball lens 100a which is capable of transmitting rays of light therethrough is attached to the retaining portion 102 by adhesion or the like. The absolute value of curvature of a portion of the ball lens 100a which is opposed to the retaining portion 102 is substantially equal to that of a concave curved face of the retaining portion 102. The ball lens 100a is made of glass or a synthetic resin material having high transparency. Further, a reflecting film 100b is applied to an entire portion of the ball lens 100a which contacts with the retaining portion 102 by which the ball lens 100a is held, and serves as a reflecting member which reflects rays of light emitted from a display section 30 hereinafter described. In the present embodiment, the ball lens 100a provided on the input pen 100 contacts with a display unit (display section 30) hereinafter described of the display apparatus 10 which is capable of emitting and receiving light. It can be seen in FIG. 1 that light emitted from the display unit passes through the ball lens 100a and is reflected by the reflecting film 100b and then the reflected light passes through the ball lens 100a and returns to the display unit.

Where the input pen 100 is used actually, it is used in such a manner that it extends not perpendicularly but in a somewhat inclined relationship with respect to the surface of the display section 30, for example, as seen in FIG. 2. Accordingly, the reflecting film 100b provided on the ball lens 100a preferably has an area smaller than one half that of the sphere. This makes it possible to efficiently reflect light even if the input pen 100 is inclined.

If the end portion (ball lens 100a) of the input pen 100 is positioned in the proximity of or contacts with the surface of the display section 30, then light emitted from the surface of the display section 30 passes through the ball lens 100a and is reflected by the reflecting film 100b, whereafter it returns to the surface of the display section 30. Further, since the light is emitted not only in a vertical direction from the display section 30, also the reflected light returns in a diffused state. However, since the reflected light is converged in the inside of and by the ball lens 100a, the efficiency in reflection is high.

Figure 3:
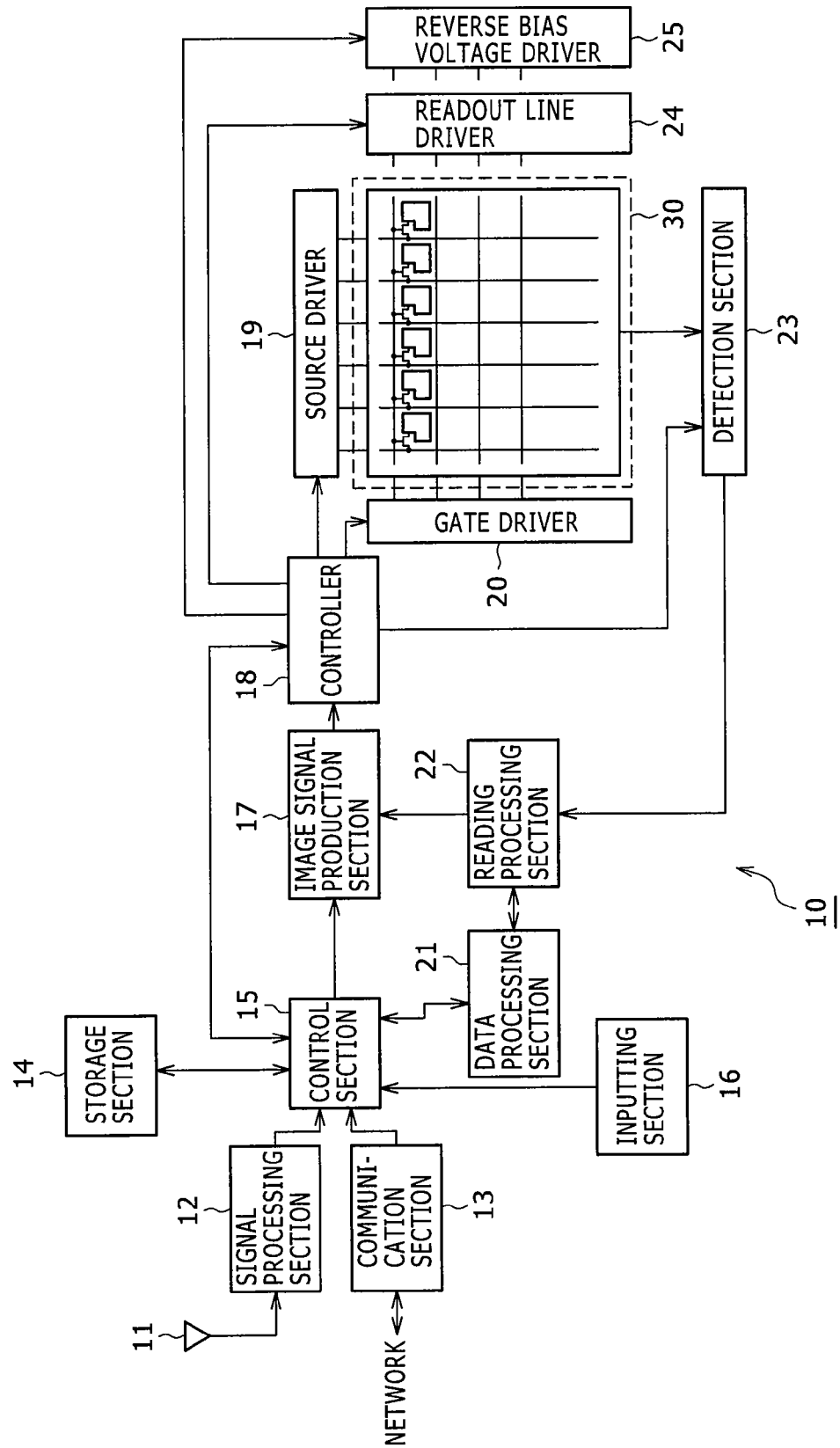
FIG. 3 is a block diagram showing an example of an internal configuration of the display apparatus shown in FIG. 2.

Now, an example of an internal configuration of the display apparatus 10 is described with reference to FIGS. 3 to 5. Referring first to FIG. 3 which shows an example of a configuration of the display apparatus 10, the display apparatus 10 includes a control section 15 for controlling operation of the entire display apparatus 10. The control section 15 reads out and executes a control program stored in a ROM (Read Only Memory) not shown. The control program is used to perform a display process in response to an instruction of a user inputted from an inputting section 16 formed from a remote controller, an operation section and so forth not shown. For example, an image of a broadcasting program of a predetermined channel or the like is displayed, or a predetermined site is accessed to display a screen of the site.

A signal processing section 12 acquires a broadcasting signal of a predetermined channel from broadcast waves obtained from an antenna 11 for receiving television broadcast waves. The signal processing section 12 outputs data of a program broadcast on the channel to the control section 15 under the control of the control section 15. A communication section 13 serving as a network interface with the outside communicates with various apparatus by wire or wireless communication through a network such as the Internet. The communication section 13 outputs data acquired through the network to the control section 15.

A storage section 14 is formed, for example, from a hard disk drive and stores data transferred thereto from an external information processing terminal, program data of a television broadcasting program or data acquired by the communication section 13. The storage section 14 may further store data detected from received light. An image signal production section 17 produces an image signal for displaying an image corresponding to data supplied thereto from the control section 15 and so forth and outputs the produced image signal to a controller 18 for controlling the display section 30.

Further, if image data read by a reading processing section 22 hereinafter described are supplied to the image signal production section 17, then the image signal production section 17 produces an image signal for superposing the read image on an image supplied from the control section 15 side or an image signal formed from the read image alone. Then, the image signal production section 17 outputs the produced image signal to the controller 18 so as to be displayed on the display section 30.

The display section 30 includes a plurality of pixels disposed in a matrix. The controller 18 controls driving of a gate driver 20 for controlling the voltage to be applied to the gate electrode of each of TFT transistors disposed in the pixels of the display section 30. The controller 18 further controls driving of a source driver 19 for controlling the voltage between the source electrode and the drain electrode of each of the TFT transistors. The TFT transistors are display controlling switches, and display data are supplied in a unit of a pixel through the TFT transistors. Each of lines driven by the source driver 19 corresponds to a display data signal line.

Further, a readout line driver 24 is provided to read out a signal accumulated in each pixel and perform a process for reading out a signal from each pixel. Furthermore, a reverse bias voltage driver 25 is provided so that a reverse bias signal is applied to each of the pixels during a reading out period of a reception light signal of the pixel.

A detection section 23 detects charge read out from each pixel during a light reception period to detect a signal obtained by reception of light. The detection processing timing at the detection section 23 is set from the controller 18. It is assumed that, in the present embodiment, the detection section 23 functions as a sensor. The detected signal is supplied to the reading processing section 22 which produces read image data in response to the reception light amounts of the pixels. The read image data produced by the reading processing section 22 are supplied to a data processing section 21. By reading reflected light from the input pen 100 when emitted rays of light of an image displayed on the display section 30 are reflected by the input pen 100, it is made possible to perform an operation of causing the locus of the input pen 100 superposed by the image signal production section 17 to be displayed in various colors or as a line of various thicknesses or various types or of erasing an inputted line.

Here, a light emitting action and a light receiving action of each light emitting element which forms the organic EL display apparatus are described in detail with reference to FIGS. 4 and 5, respectively. FIGS. 4 and 5 illustrate a principle of the configuration wherein charge is accumulated in and read out from a light emitting element so that not only light emission for displaying but also light reception can be performed.

Figure 4:
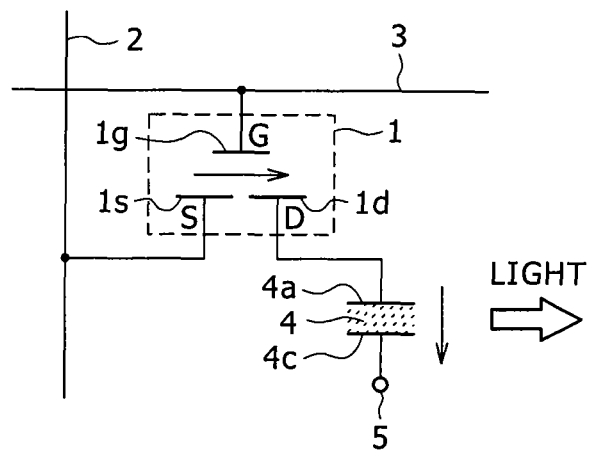
FIG. 4 is a diagrammatic view illustrating an example of a light emitting state of a display unit which is capable of emitting and receiving light.

FIG. 4 shows a pixel for displaying an image. Referring to FIG. 4, a voltage is applied in a forward direction from a gate line 3 to the gate electrode 1g of a TFT transistor 1 to turn on the TFT transistor 1. Consequently, electric current flows from the source electrode 1s to the drain electrode 1d through an active semiconductor layer (channel), which is made of amorphous silicon or polycrystalline silicon, in response to a voltage applied from a source line 2.

The anode electrode 4A of an EL element 4 is connected to the drain electrode 1d of the TFT transistor 1, and the cathode electrode 4C of the EL element 4 is connected to a counter electrode 5. When current supplied from the drain electrode 1d of the display apparatus 10 flows through the EL element 4, the EL element 4 which is a field light emitting element emits light in response to the current.

The light emitted in this manner goes out to the outside of the display apparatus 10 to display one pixel of an image. It is to be noted that, in FIG. 4, for the convenience of illustration, light is emitted in the rightward direction in FIG. 4 as indicated by a void arrow mark from the EL element 4. Actually, however, one of the anode electrode 4A and the cathode electrode 4C is formed from a transparent electrode such that the light emitted from the EL element 4 goes out to the outside through the transparent electrode.

On the other hand, when a voltage is applied in the reverse direction to the gate electrode 1g of the TFT transistor 1 from the gate line 3 to turn off the gate, even if a voltage is applied from the source line 2, no current flows through the active semiconductor layer. As a result, no current flows through the EL element 4, and therefore, no light is emitted from the EL element 4. If, in this state, light is irradiated from the outside as indicated by a void arrow mark in FIG. 5, then leak current (off current) is generated in a direction from the drain electrode 1d to the source electrode is by the light transmittance of the active semiconductor layer of the display apparatus 10 although the amount of the leak current is small. Also the EL element 4 generates current in the reverse direction without emitting light when light is irradiated thereupon in a state wherein a voltage is applied in the reverse direction to the EL element 4.

Figure 5:
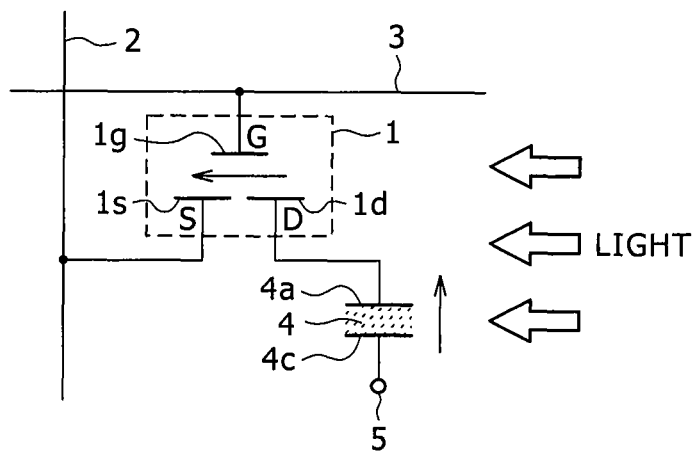
FIG. 5 is a similar view but illustrating an example of a light receiving state of the display unit which is capable of emitting and receiving light.

As the current generated in this manner is read out to the outside, it is detected that light is irradiated upon the pixel of FIG. 5 from the outside. In other words, light reception can be detected. Reception of light during emission of light can be achieved by performing light emission and light reception alternately. It is to be noted that FIGS. 4 and 5 are illustrative of the principle and do not show a signal line for reading out a light reception signal and so forth.

It is to be noted that, while the foregoing description is given taking an organic EL display unit as an example, also with other display apparatus such as a liquid crystal display unit, it is possible to perform emission of light and reception of light substantially at the same time (alternately) similarly. However, with a liquid crystal display apparatus, since an element which forms each pixel does not perform a light receiving action, it is necessary to provide a light receiving element in each pixel separately from an element for display control in order to detect reception of light.

The input pen 100 having such a configuration as described above can be fabricated in the following manner. First, the pen body 101 is formed, and the ball lens 100a is retained into the retaining portion 102 at the tip of the pen body 101. Then, the reflecting film 100b is placed between the retaining portion 102 and the ball lens 100a to complete the input pen 100. It is to be noted that order of the steps described is not limited to this and the input pen 100 may be fabricated in any other suitable order.

Figure 6A:
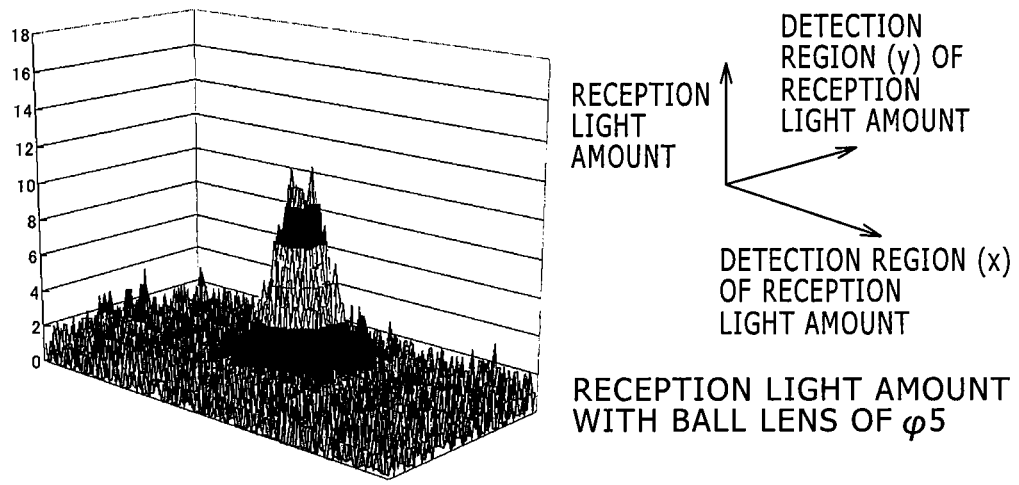
FIGS. 6A to 6C are schematic views illustrating examples of the received light amount of a display section of the display apparatus with respect to the diameter of a ball lens in an embodiment.
Figure 6B:
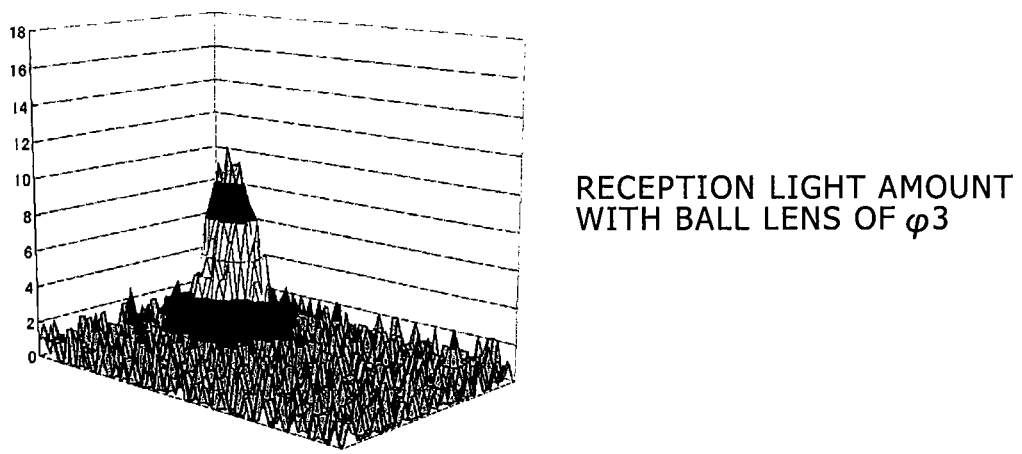
Figure 6C:
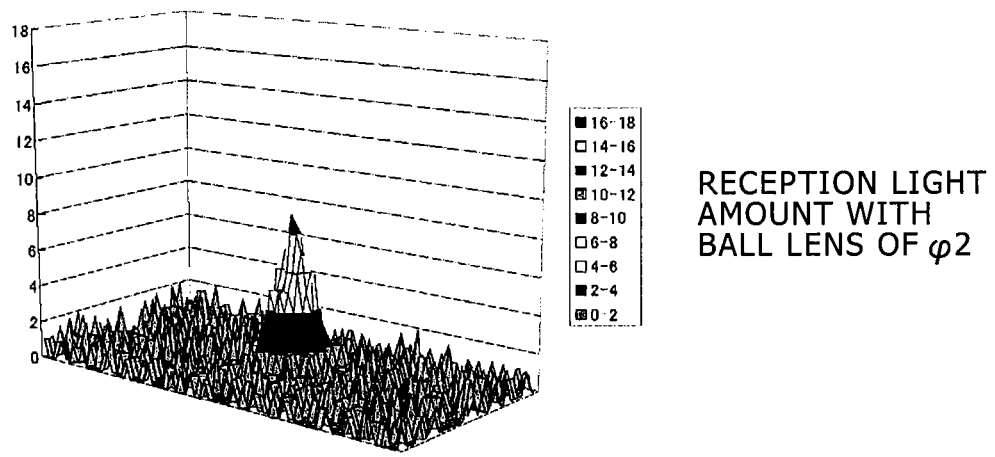

Now, examples of the received light amount of the display section 30 which depends upon the diameter of the ball lens 100a where the input pen 100 according to the present embodiment is used to perform an inputting operation are described with reference to FIGS. 6A to 6C. In FIGS. 6A to 6C, the diameter (mm) of the ball lens 100a is represented by $\phi$, and for example, $\phi 5$ represents that the diameter of the input pen 100 is 5 mm. FIG. 6A illustrates an example of the received light amount of the display section 30 where the ball lens 100a has $\phi 5$. FIG. 6B illustrates an example of the received light amount of the display section 30 where the ball lens 100a has $\phi 3$. FIG. 6C illustrates an example of the received light amount of the display section 30 where the ball lens 100a has $\phi 2$. The axis of ordinate in FIGS. 6A to 6C indicates the received light amount, and the axis of abscissa in the direction indicated by an arrow mark x indicates the detection region (x) of the received light amount while the axis of abscissa in the direction indicated by another arrow mark y indicates the detection region (y) of the received light amount. It can be seen from FIGS. 6A to 6C that, if the diameter of the ball lens 100a varies, then the diameter and the light amount of light returning to the surface of the display section 30 vary in response to the magnitude of the diameter.

Figure 7:
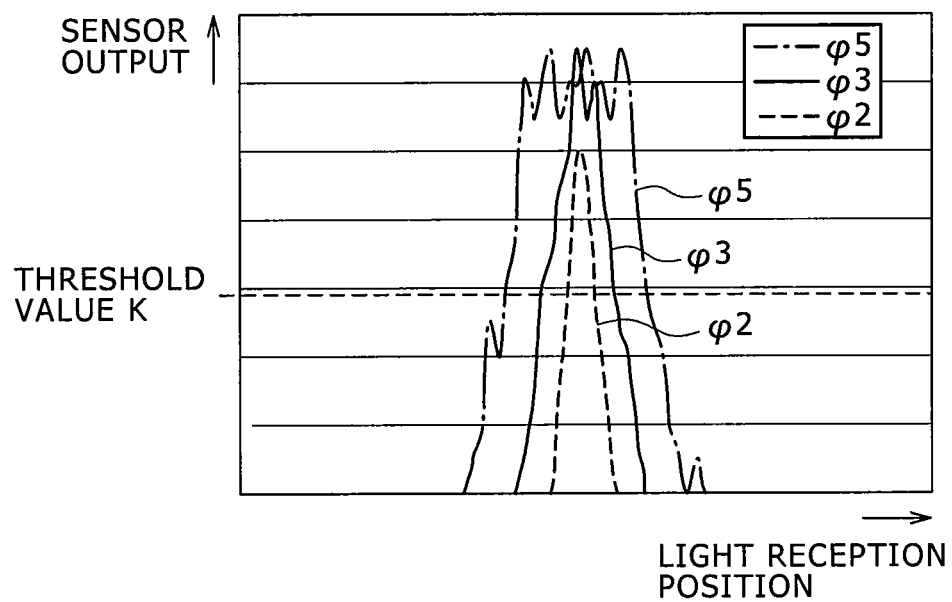
FIG. 7 is a characteristic diagram illustrating examples of an output value of a sensor with respect to the diameter of the ball lens in an embodiment.

Now, examples of the output value of the sensor (detection section 23) on the display section 30 obtained in response to the magnitude of the diameter of the ball lens 100a is described with reference to FIG. 7. In FIG. 7, the axis of ordinate indicates the output of the sensor, and the axis of abscissa indicates the light receiving position on the display section 30. Here, a curve indicated by an alternate long and short dash line indicates output values obtained where the ball lens 100a has $\phi 5$. Another curve indicated by a solid line indicates output values obtained where the ball lens 100a has $\phi 3$. A further curve indicated by a broken line indicates output values obtained where the ball lens 100a has $\phi 2$. In FIG. 7, sensor output values of the ball lens 100a for the different diameters are shown in the proximity of the center of the axis of abscissa (light receiving position). The display section 30 is capable of recognizing whether or not which one of the pens having the diameters of $\phi 5$, $\phi 3$ and $\phi 2$ is on the screen, for example, by detecting the area of the output of the sensor higher than a predetermined threshold value K.

By detecting the amount of received light of an image higher than a predetermined threshold value and the magnitude of the diameter of the light in this manner, it is possible to discriminate the size of the ball lens 100a at the tip of the input pen 100 to detect the position of the ball lens 100a.

According to an embodiment, the received light amount of the display section 30 differs among different diameters of the ball lens 100a and also the output value of the sensor of the display section 30 which is higher than the predetermined threshold value K differs among the different diameters of the ball lens 100a. Therefore, the diameter of the ball lens 100a can be discriminated readily. Consequently, even if an input pen having a different ball lens is used, the type of the pen or the like can be discriminated based on the intensity or magnitude of light reflected by the ball lens 100a. Therefore, a locus can be drawn on the display section 30 applying a color, a processing function and so forth to each input pen, and this gives rise to an advantage that the visibility can be enhanced.

Further, since the diameter of the ball lens 100a can be recognized through an inputting operation to the display section 30, even if different operations are performed using different input pens, the operations can be recognized individually. For example, where a line is displayed along a locus of the input pen 100, it is possible to achieve such a displaying process that the line is displayed in red where the input pen of $\phi 2$ is used; the line is displayed in yellow where the input pen of $\phi 3$ is used; and the line is displayed in blue where the input pen of $\phi 5$ is used. Also such an advantage can be achieved that it is possible to use such an application that a line is drawn along the locus of the input pen 100 where the input pen 100 has $\phi 2$, but is deleted at the portion of the locus where the input pen 100 has $\phi 5$.

Figure 8:
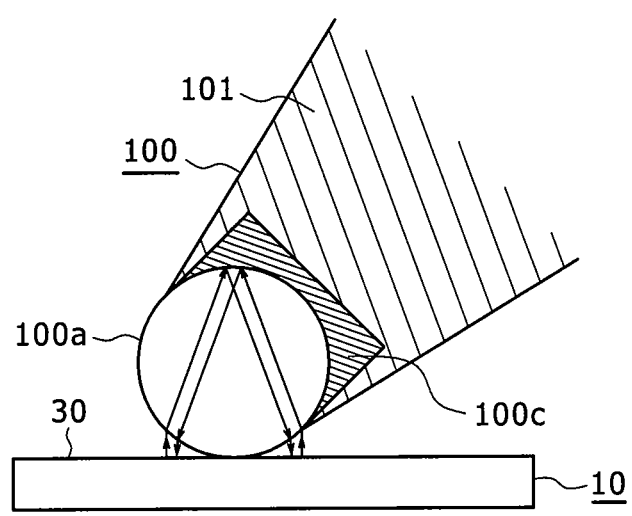
FIG. 8 is a sectional view showing an example of an input pen on which a reflecting substance is provided in an embodiment.

It is to be noted that, while, in the first embodiment described above, the reflecting film 100b is applied to the entire portion of the ball lens 100a which contacts with the retaining portion 102 by which the ball lens 100a is retained so that it reflects rays of light from the display section 30, a substance which reflects light may be provided on the outside of the ball lens 100a. FIG. 8 shows an example wherein a reflecting substance 100c which is capable of reflecting rays of light is provided at an end portion of the input pen 100 and the ball lens 100a is fitted in the reflecting substance 100c. More particularly, FIG. 8 shows a cross section of a portion of the input pen 100 in the proximity of the tip. Referring to FIG. 8, the input pen 100 of the present form is formed by injecting the reflecting substance 100c into the end portion of the input pen 100 and fitting the ball lens 100a in the reflecting substance 100c. Therefore, there is no necessity to form a reflecting film on the ball lens 100a by vapor deposition, and consequently, the input pen 100 can be formed comparatively readily. This exhibits a high effect upon mass production and so forth of the input pen 100. Further, thanks to the reflecting substance 100c, similar functions and advantages to those of the first embodiment described above can be achieved by the input pen 100.

Second Embodiment

Figure 9:
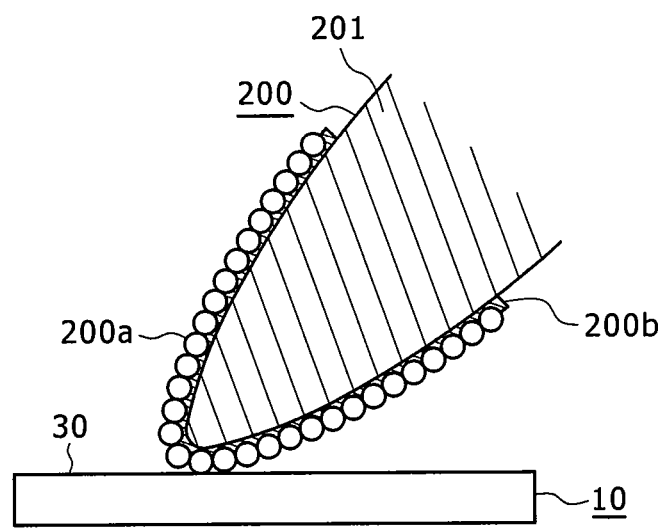
FIG. 9 is a sectional view showing an example of an input pen to which a recursive reflecting material is applied according to an embodiment.

Now, a second embodiment is described with reference to FIGS. 9 and 10. FIG. 9 shows a portion of an input pen in the proximity of the tip in a cross section. A plurality of very small ball lenses are juxtaposed at an end portion of the input pen 200. While, in the first embodiment described above, only one ball lens 100a is provided at the extremity of the input pen 100, in the present embodiment, a plurality of ball lenses are disposed so as to reflect light.

The display apparatus 10 has a basic internal configuration similar to that of the first embodiment described hereinabove with reference to FIGS. 3 to 5. Therefore, detailed description of the internal configuration of the display apparatus 10 is omitted herein to avoid redundancy. A reflecting material 200b is applied as a reflecting member along the profile of the end portion of the input pen 200 of the present embodiment to an end portion of a bar-like pen body 201 of the input pen 200, and a plurality of very small ball lenses 200a are juxtaposed on the reflecting material 200b. Thus, the reflecting material 200b is formed as a recursive reflecting member. The recursive reflecting member is a member which is capable of reflecting rays of light from a light source as they are toward the light source by disposing a plurality of very small ball lenses 200a, which are made of glass or a synthetic resin material having high transparency and is capable of transmitting rays of light therethrough, in a juxtaposed relationship at the end portion of the input pen 100. The recursive reflecting member is thus capable of reflecting incoming light from the display section 30 efficiently toward the display section 30.

Figure 10:
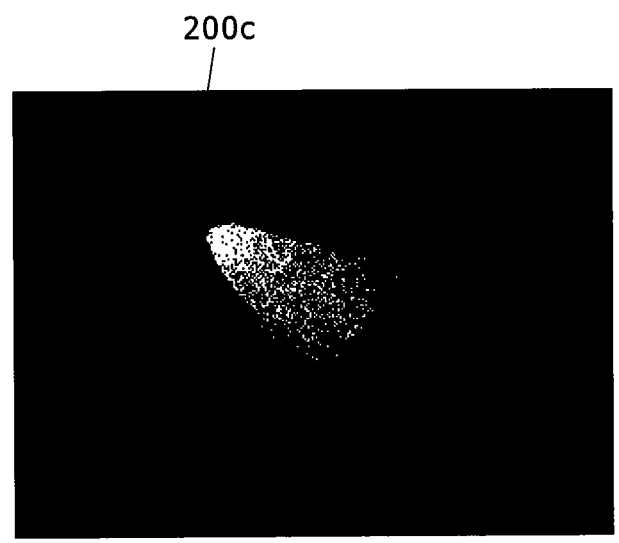
FIG. 10 is a schematic view showing an example of a displayed image by reflected light of the input pen of an embodiment.

FIG. 10 shows an example of an image formed from reflected light from the input pen 200 which is detected on the display section 30 where the input pen 200 is used. If the end portion of the input pen 200 according to the present embodiment is positioned in the proximity of or contacts with the surface of the display section 30, then rays of light emitted from the display section 30 are reflected by the ball lenses 200a, and the reflected light is irradiated on the display section 30. Here, the position of the end portion of the input pen 200 is recognized as reflected light 200c. The reflected light 200c exhibits a distribution in density in accordance with the distance between the input pen 200 and the display section 30, and the most dense or bright portion of the reflected light 200c is recognized as the tip of the input pen 200.

In this manner, an input pen which uses a recursive reflecting member can be used to perform an inputting operation.

According to the present embodiment, since a recursive reflecting member formed by the very small ball lenses 200a and the reflecting material 200b is formed on the surface of the tip of the input pen 200, rays of light emitted from the display section 30 can be reflected efficiently. Since the recursive reflecting member returns reflected light toward the light source, the display section 30 is capable of acquiring a received light amount necessary for recognition of an inputting operation. Consequently, there is an advantage that an inputting operation can be recognized with certainty.

Further, since the ball lenses 200a themselves are very small and besides the reflecting material 200b can be applied to the tip of a pen of any profile, there is no restriction to the profile of the tip of the pen. Therefore, there is an advantage that, if a recursive reflecting member in the present embodiment is applied not only to a structure as an input pen but also to any structure as a fingertip or of any piece of stationery, the structure can be used flexibly as an inputting apparatus similar to the input pen 200.

Third Embodiment

Figure 11:
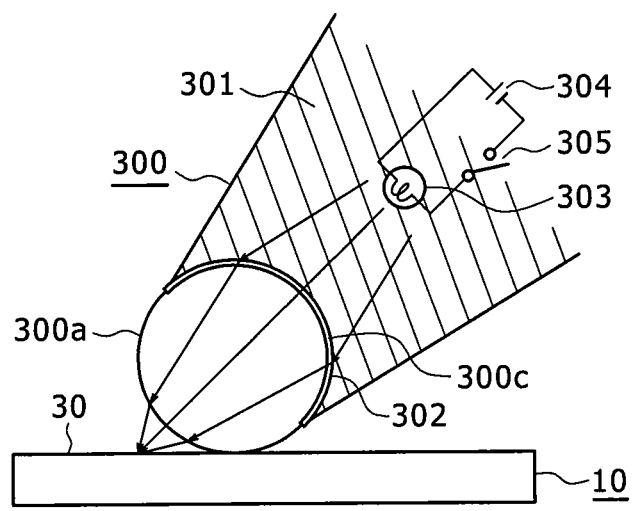
FIG. 11 is a sectional view showing an example of an input pen according to an embodiment wherein a semi-transmission film is provided on a ball lens.
Figure 12:
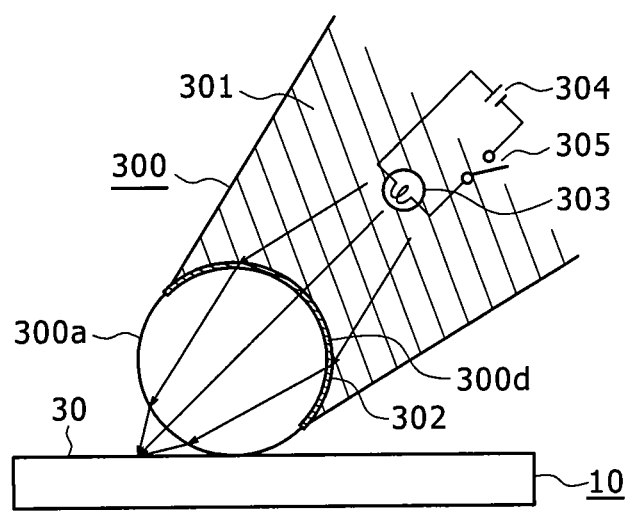
FIG. 12 is a sectional view showing an example of an input pen according to an embodiment wherein a wavelength-selective reflecting film is provided on a ball lens and a light source is provided.

Now, a third embodiment is described with reference to FIGS. 11 and 12. According to the present invention, a built-in light source is provided in the inside of the input pen of the first embodiment described hereinabove such that, as the built-in light source emits light, light is emitted from an end portion of the input pen to perform an inputting operation to the display apparatus.

The display apparatus 10 in the present embodiment has a basic internal configuration similar to that of the first embodiment described hereinabove with reference to FIGS. 3 to 5. Therefore, detailed overlapping description of the internal configuration of the display apparatus 10 is omitted herein to avoid redundancy. FIG. 11 shows a portion of an input pen in the proximity of the tip in a cross section. In particular, FIG. 11 shows a cross section of the end portion of the input pen where it is configured as a combination of a ball lens and a light source. Referring to FIG. 11, a spherical ball lens 300a which is capable of transmitting rays of light therethrough is attached to a retaining portion 302 at an end portion of a bar-like pen body 301 of the input pen 300. The ball lens 300a is formed from glass or synthetic resin material having high transparency. A light source 303 is formed from a light emitting diode (LED), a laser diode (LD) or the like and is built in the input pen 300 such that the input pen 300 is capable of irradiating rays of light from the light source 303 upon the ball lens 300a so as to be focused on the display section 30. A semi-transparent film 300c which allows rays of light from the light source 303 to pass therethrough but reflects incoming light from the display section 30 is applied to an entire portion of the input pen 300 which contacts with the retaining portion 302 by which the ball lens 300a is held. The light source 303 receives supply of power from a cell 304, which is a built-in power supply of the input pen 300, to emit light. A switch 305 is used to perform an on/off operation for supplying power to the light source 303.

Since the input pen 300 has the light source 303 built therein in this manner, when the light source 303 is not lit, incoming light from the display section 30 is reflected by the semi-transparent film 300c. Then, if the light source 303 is lit, then the light from the light source 303 is irradiated at a position in the proximity of or close to the reflected image. At this time, if it is recognized that an image is formed newly at a position in the proximity of or close to the reflected image on a received light image obtained on the surface of the display section 30, then it can be discriminated that the light source 303 is lit. Or where the light from the light source 303 overlaps with the reflected image, the intensity of light increases, and therefore, by detecting a level variation of the received light image signal obtained on the surface of the display section 30, the position of the input pen 300 can be specified on the reflection mage and lighting of the light source 303 can be discriminated from the level variation.

In particular, where the semi-transparent film 300c is used for the ball lens 300a of the input pen 300, if the switch 305 is switched off, then only reflected light from the semi-transparent film 300c is irradiated upon the display section 30. However, if the switch 305 is switched on, then also rays of light from the light source 303 are irradiated upon the display section 30 together with the reflected light. Therefore, the display apparatus 10 is capable of recognizing switching on/off of the switch 305 depending upon the intensity of light irradiated upon the display section 30.

Where a semi-transmission film is used as a material to be applied to the ball lens 300a in this manner, if the light source 303 is turned off, then the input pen 300 can be used as a reflection type pen similar to that of the first embodiment described hereinabove. Further, if the light source 303 is turned on, then the input pen 300 can be used as a light emitting pen which emits rays of light from the light source 303 to the surface of the display section 30.

It is to be noted that, as a material to be applied to the ball lens 300a, a film having wavelength selectivity may be used in place of a semi-transmission film. FIG. 12 shows an example of a configuration wherein a wavelength-selective reflecting film 300d which is capable of selectively reflecting rays of light of a certain wavelength is applied to an entire portion of the input pen 300 which contacts with the retaining portion 302 by which the ball lens 300a is held. More particularly, FIG. 12 is a sectional view of a portion of the input pen 300 in the proximity of the tip. The configuration of the other portion of the input pen 300 is similar to that described hereinabove with reference to FIG. 11, and overlapping description of the configuration is omitted herein to avoid redundancy.

Where the input pen 300 has such a configuration as described above, a light source 303 which emits light including, for example, a blue region as a wavelength of light to be emitted is prepared. Further, a wavelength-selective reflecting film 300d which allows only rays of light in the blue region to pass therethrough but reflects light in the other wavelength regions is applied to the ball lens 300a of the input pen 300. At this time, if a blue light emitting diode, a blue laser diode or the like is used as the light source 303, then light of the light source 303 can be irradiated on the surface of the display section 30 without being attenuated. When the light source 303 is not lit, incoming light from the surface of the display section 30 is reflected by the wavelength-selective reflecting film 300d, and consequently, the light except light in the blue region can be detected as a reflected image by the surface of the display section 30.

Here, since the light reflected by the wavelength-selective reflecting film 300d is light in the wavelength bands other than that of the blue, if the light incoming to the sensor on the surface of the display section 30 is blue, then it can be decided that the light originates from the light source 303, but if the incoming light is any other color light than the blue light, then it can be decided that the incoming light is reflected light. If this function is utilized, then a plurality of instructions can be provided through the surface of the display section 30 using a single input pen.

In particular, where the wavelength-selective reflecting film 300d is used for the ball lens 300a of the input pen 300, for example, the wavelength-selective reflecting film 300d allows rays of light of the blue wavelength to selectively pass therethrough, and, for example, a blue light emitting diode is used for the light source 303. At this time, if the switch 305 is switched off, then only reflected light from the wavelength-selective reflecting film 300d is irradiated on the display section 30. However, if the switch 305 is turned on, then also rays of blue light from the light source 303 are irradiated upon the display section 30 in addition to the reflected light. Therefore, the display apparatus 10 is capable of recognizing switching on/off of the switch 305 by recognizing irradiation of rays of blue light on the display section 30.

In this manner, by providing the light source 303 in the inside of the input pen 300, a plurality of operations can be performed using the single input pen. If the light source 303 is lit, then the input pen 300 can be used as a light emitting pen which irradiates light in the blue region having passed through the wavelength selective reflecting film at a position in the proximity of or close to the reflection image. If it is recognized that an image in the blue region is formed at a position at which the image overlaps with the reflected image or at a position in the proximity of or close to the reflected image on the received light image obtained on the surface of the display section 30, then it can be decided that the light source is lit.

According to the present embodiment, since the light source 303 is provided in the inside of the input pen 300, a plurality of operations can be performed using the single input pen. Consequently, there is an advantage that, when the light source 303 is lit while a line is being drawn by the reflected image, various operations can be performed such as to display the line changing the color only at the portion or to draw the portion with a thicker line.

Further, since the switch 305 for turning on/off of lighting of the light source 303 is provided in the input pen 300, an operation similar to a mouse operation in the past which is used in drawing can be used. For example, such an action or process may be allocated that, if the input pen 300 is placed at a position of an object and the switch is switched on to turn on the input pen 300, then it is considered that a click operation is performed, or if the input pen 300 is moved while the light source 303 is kept lit, then it is considered that a dragging operation is performed. In this instance, the input pen 300 can be applied also to such a plotting application that, for example, if the input pen 300 is moved while the switch is kept on, the locus is displayed, but if the switch is turned off, then no locus is displayed even if the input pen 300 is moved. Consequently, there is an advantage that various operations can be recognized.

Further, since an on/off operation of the switch 305 can be recognized with certainty during an inputting operation, an inputting operation by means of the input pen 300 can be performed as a clicking operation similar to that of a mouse as is used in the past intuitively without referring to a complicated manual or the like. Consequently, there is an advantage that the present embodiment is superior in operability.

Further, since the light source 303 is built in the input pen 300, even if the input pen 300 is spaced a little away from the display section 30, it is possible to irradiate rays of light upon the display section 30 to input a locus. Consequently, there is an advantage that, for example, at a place of presentation, it is possible to perform an inputting operation to a display unit of a large screen.

It is to be noted that, while, in the present embodiment, a semi-transmitting film or a wavelength-selective reflecting film is applied to the ball lens 300a so that rays of light from the light source 303 are converged on the surface of the display section 30, the input pen 300 may be used as a light emitting pen without applying anything to the ball lens 300a. In this instance, although rays of light from the light source 303 somewhat disperse, since the end portion of the input pen 300 is sufficiently thin, it is possible to irradiate rays of light upon the display section 30 to such a degree that there is no particular problem in practical use. Further, a color filter or a plurality of light emitting diodes or the like which emit rays of different wavelengths are provided for the light source 303 so that a plurality of rays of light of different colors may be used for inputting. This provides an advantage that the visibility can be raised to make it possible to perform an inputting operation.

Further, the inner face of the input pen 300 may be formed as a mirror surface so that rays of light from the light source 303 may be converged efficiently at the end portion of the input pen 300. Further, although the transmission light of the ball lens 300a is focused on the display section 30, it is not necessarily focused. Thus, a ball lens which is capable of producing a somewhat converged light flux may be used. Where such a ball lens as just described is used, there is an advantage that rays of light from the light source 303 can be emitted from the input pen 300 with a single configuration to perform an inputting operation.

Further, while the cell 304 which is built in the input pen 300 is used as a power supply, power may otherwise be supplied from an external power supply. By the configuration just described, there is no necessity to take care of the life of a cell any more. Further, there is an advantage that, since the weight of the cell can be reduced, miniaturization can be anticipated and superior operability can be anticipated.

Fourth Embodiment

Now, a fourth embodiment is described with reference to FIGS. 13 and 14. The resent embodiment is generally configured such that a wavelength-selective reflecting film is formed in place of the total reflection film applied to the surface of the ball lens of the input pen of the first embodiment described hereinabove.

Figure 13:
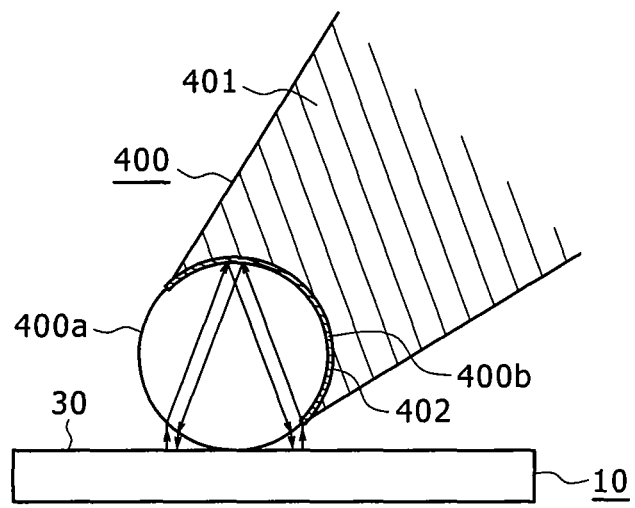
FIG. 13 is a sectional view showing an example of an input pen according to an embodiment wherein a wavelength-selective reflecting film is provided on a ball lens.
Figure 14:
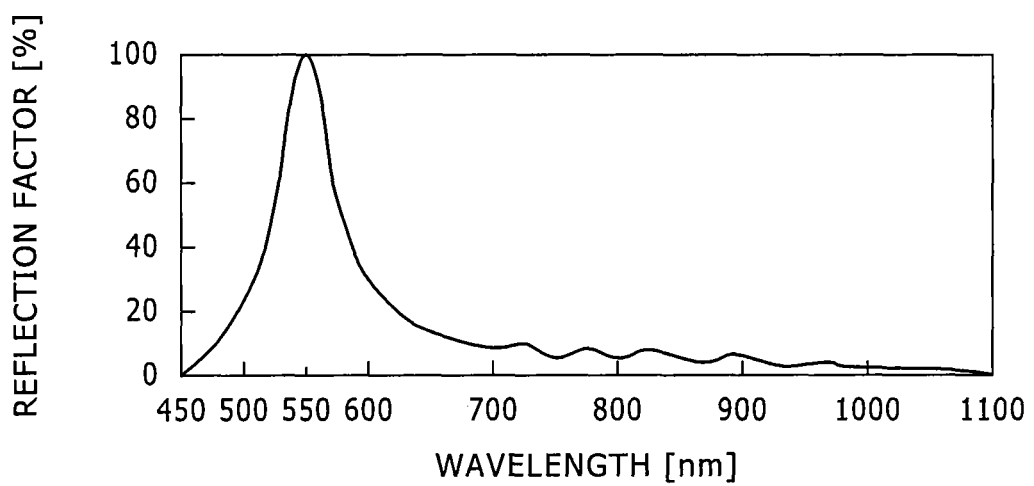
FIG. 14 is a diagram illustrating an example of a reflection characteristic of the wavelength-selective reflecting film of the input pen shown in FIG. 13.

FIG. 13 shows a cross section of a portion of the input pen in the proximity of the tip. It is to be noted that the display apparatus 10 according to the present embodiment has a basic internal configuration similar to that according to the first embodiment described hereinabove with reference to FIGS. 3 to 5. Therefore, detailed overlapping description of the configuration is omitted herein to avoid redundancy. A spherical ball lens 400a which transmits rays of light therethrough is attached to a retaining portion 402 at an end portion of a bar-like pen body 401 of the input pen 400. The ball lens 400a is made of glass or a synthetic resin material having high transparency. Further, a wavelength-selective reflecting film 400b serving as a reflecting member for reflecting rays of light of a particular wavelength from among rays of light emitted from the display section 30 is applied to the inner side of the retaining portion 402 of the input pen 400 for receiving the ball lens 400a. More particularly, the wavelength-selective reflecting film 400b is applied to an entire portion of the ball lens 400a which contacts with the retaining portion 402 by which the ball lens 400a is held. Consequently, only rays of light in some wavelength region from among rays of light emitted from the surface of the display section 30 can be reflected to the surface of the display section 30.

The wavelength-selective reflecting film 400b in the present embodiment has a reflection characteristic of selectively reflecting rays of light of the wavelength of green. FIG. 14 illustrates the reflection characteristic of the wavelength-selective reflecting film 400b in the present embodiment. From FIG. 14, it can be recognized that, where the wavelength-selective reflecting film 400b which selectively reflects only rays of light in the green region is formed on the ball lens 400a, rays of light returning from the ball lens 400a are green (whose wavelength is around 500 nm).

In this manner, an input pen which is capable of selectively reflecting rays of light only of a particular wavelength from among rays of light received from the display section 30 to the display section 30 can be used.

According to the present embodiment, since only rays of light of a particular wavelength from within incoming light from the display section 30 are selectively reflected, colored rays of light can be emitted from the tip of the input pen 400. Consequently, the present embodiment is advantageous in that it is superior in visibility.

It is to be noted that, while, in the present embodiment described above, rays of light to be reflected have the wavelength of green (whose wavelength is around 550 nm), the input pen 400 can be used as a pen for exclusive use to reflect not only rays of light of red, green or blue but also rays of light of various colors by varying the reflection characteristic. Therefore, there is an advantage that an input pen which emits rays of light of a favorite color to a user can be used to perform an operation.

Further, if a display apparatus having a mechanism which is capable of detecting a color of a received light image is used, then it is possible to identify the color of the reflected light. Therefore, there is an advantage that, by changing the color to be displayed in accordance with an input pen to be used or by causing different actions or processes to be performed among different input pens, then complicated drawing can be performed by a simple operation. Further, since an inputting operation can be performed similarly to an inputting operation performed using an ordinary color pen, there is an advantage that it can be discriminated rapidly by the user what color is to be inputted.

Fifth Embodiment

Now, a fifth embodiment is described with reference to FIGS. 15 and 16. The present embodiment is generally configured such that a wavelength-selective transmission film is formed on the opposite side to the total reflection film of the ball lens of the input pen described hereinabove in connection with the first embodiment.

Figure 15:
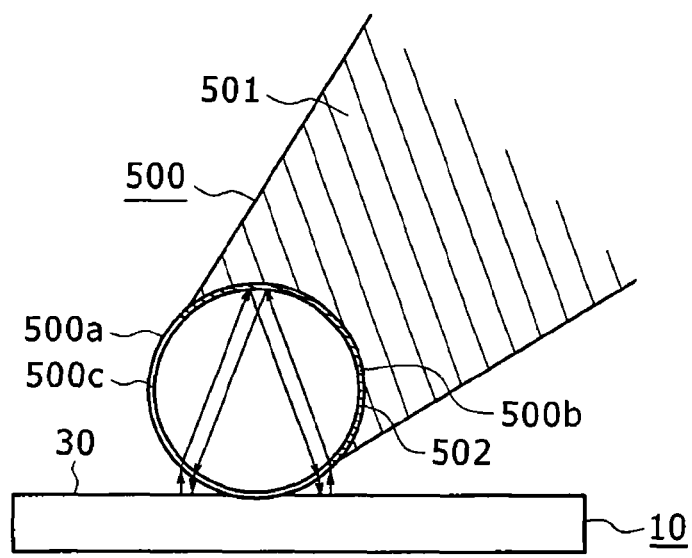
FIG. 15 is a sectional view showing an example of an input pen according to an embodiment of the present invention wherein a wavelength-selective transmission film and a total reflection film are provided on a ball lens.
Figure 16:
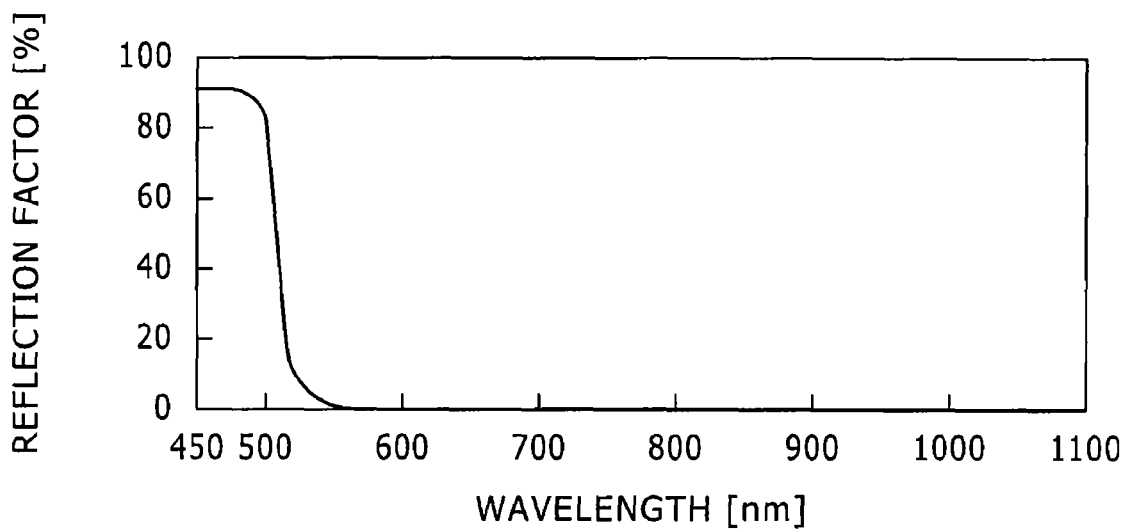
FIG. 16 is a diagram illustrating an example of a transmission characteristic of the wavelength-selective transmission film of the input pen shown in FIG. 15.

FIG. 15 shows a cross section of the input pen in the proximity of the tip. It is to be noted that the display apparatus 10 according to the present embodiment has a basic internal configuration similar to that according to the first embodiment described hereinabove with reference to FIGS. 3 to 5. Therefore, detailed overlapping description of the configuration is omitted herein to avoid redundancy. A spherical ball lens 500a which transmits rays of light therethrough is attached to a retaining portion 502 at an end portion of a bar-like pen body 501 of the input pen 500. The ball lens 500a is made of glass or a synthetic resin material having high transparency. Further, a total reflection film 500b serving as a reflecting member for reflecting rays of light emitted from the display section 30 is applied to an entire portion of the ball lens 500a which contacts with the retaining portion 502 by which the ball lens 500a is held. Further, a wavelength-selective transmission film 500c which transmits rays of light of a particular wavelength therethrough is applied to the entire outer side of the ball lens 500a outside the pen body 501 of the input pen 500. Consequently, rays of light in some wavelength region from among rays of light emitted from the surface of the display section 30 are introduced into the ball lens 500a through the wavelength-selective transmission film 500c. Then, the incoming rays of light are totally reflected by the total reflection film 500*b* and pass through the wavelength-selective transmission film 500*c*, whereafter they are irradiated upon the surface of the display section 30.

The total reflection film 500*b* in the present embodiment has a transmission characteristic of selectively transmitting rays of light of wavelengths of green to blue. FIG. 16 illustrates such a transmission characteristic of the total reflection film 500*b* in the present embodiment. From FIG. 16, it can be recognized that, where the total reflection film 500*b* which selectively reflects only rays of light in the green region is formed on the ball lens 500*a*, rays of light returning from the ball lens 500*a* are blue to green (whose wavelength is 500 nm or less).

In this manner, an input pen which is capable of selectively transmitting rays of light only of a particular wavelength from among rays of light received from the display section 30 to the display section 30 can be used.

According to the present embodiment, since only rays of light of a particular wavelength from within incoming light from the display section 30 are selectively transmitted and then reflected, colored rays of light can be emitted from the tip of the input pen 500. Consequently, the present embodiment is advantageous in that it is superior in visibility.

It is to be noted that, while, in the present embodiment described above, rays of light to be transmitted have the wavelength of green (which is 500 nm or less), the total reflection film 500*b* can be applied to a pen for exclusive use to transmit not only rays of light of red, green or blue but also rays of light of various colors by varying the transmission characteristic. Therefore, there is an advantage that an input pen which emits rays of light of a favorite color to a user can be used.

Further, if a display apparatus having a mechanism which is capable of detecting the color of a received light image is used, then it is possible to identify the color of the transmitted light. In this instance, the color of rays of light to return to the surface side of the display section 30 can be controlled by causing rays of light of a desired wavelength to be selectively transmitted from among rays of light emitted from the surface of the display section 30. Therefore, there is an advantage that, by changing the color to be displayed or erasing a line in accordance with an input pen to be used or by causing different actions or processes to be performed among different input pens, then complicated drawing can be performed by a simple operation. Further, since an inputting operation can be performed similarly to an inputting operation which is performed using an ordinary color pen, there is an advantage that it can be discriminated rapidly by the user what color is to be inputted and an inputting operation can be performed simply.

Sixth Embodiment

Now, a sixth embodiment is described with reference to FIG. 17. The present embodiment is generally configured such that the ball lens itself of the input pen described hereinabove in connection with the first embodiment is formed using a wavelength-selective transmission material.

Figure 17:
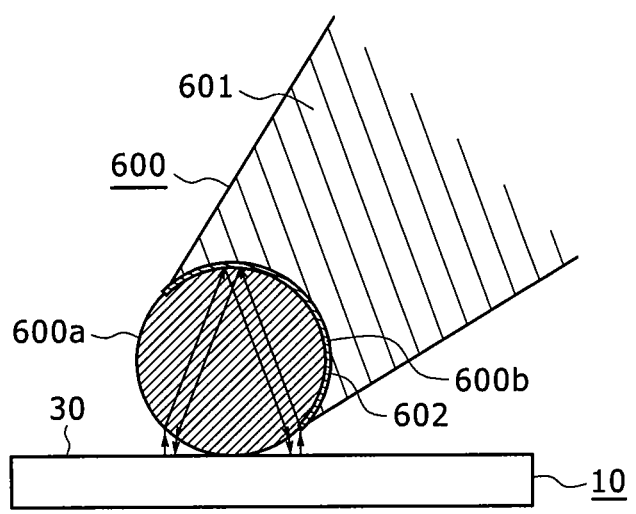
FIG. 17 is a sectional view showing an example of an input pen according to an embodiment wherein a wavelength-selective transmission material is used for a ball lens.

FIG. 17 shows a cross section of the input pen in the proximity of the tip. It is to be noted that the display apparatus 10 according to the present embodiment has a basic internal configuration similar to that according to the first embodiment described hereinabove with reference to FIGS. 3 to 5. Therefore, detailed overlapping description of the configuration is omitted herein to avoid redundancy. A spherical ball lens 600*a* which transmits rays of light therethrough is attached to a retaining portion 602 at an end portion of a bar-like pen body 601 of the input pen 600. The ball lens 600*a* is made of a wavelength-selective transmission material which transmits rays of light of a particular wavelength. Further, a total reflection film 600*b* serving as a reflecting member for reflecting rays of light emitted from the display section 30 is applied to the inner side of the pen body 601 of the input pen 600 for receiving the ball lens 600*a*. More particularly, the total reflection film 600*b* is applied to an entire portion of the ball lens 600*a* which contacts with the retaining portion 602 by which the ball lens 600*a* is held. Consequently, rays of light in some wavelength region from among rays of light incoming to the ball lens 600*a* pass through the ball lens 600*a*.

Consequently, rays of light of some wavelength region from among rays of light emitted from the surface of the display section 30 enter the ball lens 600*a*. The incoming rays of light are totally reflected by the total reflection film 600*b* and then pass through the ball lens 600*a* made of a wavelength-selective transmission material until they enter the surface of the display section 30.

In this manner, an input pen which is capable of selectively transmitting rays of light only of a particular wavelength from among rays of light received from the display section 30 therethrough so that they are reflected to the display section 30 can be used.

According to the present embodiment, since only rays of light of a particular wavelength from within incoming light from the display section 30 are selectively transmitted and then reflected, colored rays of light can be emitted from the tip of the input pen 600. Consequently, the present embodiment is advantageous in that it is superior in visibility.

It is to be noted that, in the present embodiment described above, a wavelength-selective transmission material used to form the ball lens 600*a* can be used to form a pen for exclusive use to transmit not only rays of light of red, green or blue but also rays of light of various colors by varying the reflection characteristic. Therefore, there is an advantage that an input pen which emits rays of light of a favorite color to a user can be used to perform an operation.

Further, if a display apparatus having a mechanism which is capable of detecting a color of a received light image is used, then it is possible to identify the color of the reflected light. In this instance, the color of rays of light returning to the surface side of the display section 30 can be controlled by selectively transmitting only rays of light of a desired wavelength from among rays of light emitted from the surface of the display section 30. Therefore, there is an advantage that, by changing the color to be displayed in accordance with an input pen to be used or by causing different actions or processes to be performed among different input pens, complicated drawing can be performed by a simple operation. Further, since an inputting operation can be performed similarly to an inputting operation which is performed using an ordinary color pen, there is an advantage that it can be discriminated rapidly by the user what color is to be inputted and an inputting operation can be performed simply.

In this manner, according to the an embodiment, by performing an inputting operation using the input pen on the display section, light emitted from the surface of the display section can be returned to the display section from the reflecting face of the ball lens on the body side of the input pen. Further, light more intense than that of light emitted from an input pen used in the past is reflected by the surface of the display section so as to allow an inputting operation. Consequently, there is an advantage that the position of the tip of the input pen can be detected readily.

Further, according to an embodiment, since the input pen has such a simple structure that a reflecting member such as a reflecting film or a transmitting film is provided at part of a ball lens, it can be produced at a low cost. Consequently, there is an advantage that the input pen can be fabricated in a high efficiency.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An inputting apparatus for inputting information making use of light, comprising:
   a body member having an end portion;
   a substantially spherical lens member retained at the end portion of said body member;
   a reflecting member disposed between the end portion of said body member and said lens member and configured to reflect at least part of light incoming from the outside of said inputting apparatus, wherein the reflecting member covers an entire portion of the lens member contacting the end portion, and wherein the reflecting member is a film; and
   a wavelength-selective transmission film disposed on an opposite side of said lens member to said reflecting member and configured to selectively transmit light in a predetermined wavelength region.

2. An inputting apparatus according to claim 1, wherein the end portion of said body member has a concave curved face, and a curved face of a portion of said lens member which is opposed to the end portion of said body member has an absolute value of a radius of curvature substantially equal to that of the concave curved face at the end portion of said body member.

3. An inputting apparatus according to claim 1, wherein said lens member is retained such that a portion thereof other than the portion which is opposed to the end portion of said body member projects from the end portion of said body member.

4. An inputting apparatus according to claim 1, wherein said reflecting member is a total reflection film configured to totally reflect the incoming light, and the total reflection film is disposed over an area which is smaller than one half the overall surface area of said lens member.

5. An inputting apparatus according to claim 1, further comprising:
   a light source built in said body member and configured to emit light; and
   a switch configured to change over a light emitting action of said light source between an on state and an off state, said reflecting member being a semi-transmission film which reflects the incoming light but transmits light from said light source therethrough when said light source is in the on state.

6. An inputting apparatus according to claim 1, further comprising:
   a light source built in said body member and configured to emit light which includes a predetermined wavelength region; and
   a switch configured to change over a light emitting action of said light source between an on state and an off state;
   said reflecting member being a wavelength-selective reflecting film configured to selectively reflect light in wavelength regions other than the predetermined wavelength region.

7. An inputting apparatus according to claim 1, wherein said reflecting member is a wavelength-selective reflecting film configured to selectively reflect light in a predetermined wavelength region from within the incoming light.

8. An inputting apparatus according to claim 1, wherein said reflecting member is a total reflection film configured to totally reflect the incoming light.

9. An inputting apparatus according to claim 1, wherein said lens member is made of a wavelength-selective transmission material configured to selectively transmit light in a predetermined wavelength region therethrough.

10. An inputting apparatus according to claim 1, wherein said lens member includes a plurality of lens elements retained by the end portion of said body member.

11. An inputting apparatus according to claim 10, wherein each of said plurality of lens elements protrude from an extremity of said end portion.

12. An inputting apparatus according to claim 1, wherein at least half of the lens member protrudes from an extremity of said end portion.

13. An inputting apparatus according to claim 1, wherein the wavelength-selective transmission film covers an entire portion of the lens member protruding from the end portion.

14. An information inputting method for inputting information to a display apparatus which has a light receiving function and a light emitting function by using an inputting apparatus, comprising:
   inputting display light emitted from said display apparatus making use of the light emitting function of said display apparatus to said inputting apparatus through a substantially spherical lens member which is retained at an end portion of said inputting apparatus and is capable of transmitting the display light therethrough;
   reflecting, by a reflecting member of the inputting apparatus, at least part of the display light incoming to said inputting apparatus in the inside of said inputting apparatus so as to conduct to said display apparatus side, wherein the reflecting member covers an entire portion of the lens member contacting the end portion, and wherein the reflecting member is a film, and a wavelength-selective transmission film is disposed on an opposite side of said lens member to said reflecting member and configured to selectively transmit light in a predetermined wavelength region; and
   receiving the reflected display light making use of the light receiving function of said display apparatus.

15. An information inputting method according to claim 14, wherein a plurality of inputting apparatuses among which the size of the lens member is different are prepared, and said information inputting method further comprises:
   detecting a difference in reflected light amount of the display light corresponding to a difference in size of the lens member among said plurality of inputting apparatuses;
   discriminating, based on a result of the detection, which one of said plurality of inputting apparatuses is currently used; and
   performing image display based on a result of the discrimination by means of said display apparatus.

16. An information inputting method according to claim 14, wherein a plurality of inputting apparatuses among which the wavelength region of the reflected light originating from the display light is different are prepared, and said information inputting method further comprises the steps of:
   detecting a difference in wavelength region of the reflected light among said plurality of inputting apparatuses;

discriminating, based on a result of the detection, which one of said plurality of inputting apparatuses is currently used; and performing image display based on a result of the discrimination by means of said display apparatus.

17. A fabrication method for an inputting apparatus which inputs information making use of light, comprising:

forming a body member for said inputting apparatus;

retaining a substantially spherical lens member at an end portion of said body member;

disposing a reflecting member capable of reflecting at least part of incoming light from the outside of said inputting apparatus between the end portion of said body member and said lens member, wherein the reflecting member is disposed to cover an entire portion of the lens member contacting the end portion, and wherein the reflecting member is a film; and disposing a wavelength-selective transmission film on an opposite side of said lens member to said reflecting member and configured to selectively transmit light in a predetermined wavelength region.

* * * * *